(12) United States Patent
Wilkendorf

(10) Patent No.: US 7,354,076 B2
(45) Date of Patent: Apr. 8, 2008

(54) FITTING FOR FORMATION OF A FLUID-CONDUCTING CONNECTION

(75) Inventor: Werner Wilkendorf, Ottweiler (DE)

(73) Assignee: Hydac Filtertechnik GmbH, Sulzbach/Saar (DE)

( * ) Notice: Subject to any disclaimer, the term of this patent is extended or adjusted under 35 U.S.C. 154(b) by 102 days.

(21) Appl. No.: 11/059,341

(22) Filed: Feb. 14, 2005

(65) Prior Publication Data
US 2006/0157977 A1 Jul. 20, 2006

(30) Foreign Application Priority Data
Jan. 14, 2005 (DE) .................. 10 2005 001 828

(51) Int. Cl.
*F16L 13/00* (2006.01)
(52) U.S. Cl. .................. 285/285.1; 285/148.13; 285/239; 285/293.1; 285/423; 220/288; 220/601
(58) Field of Classification Search ............. 285/141.1, 285/239, 285.1, 286.2, 293.1, 399, 148.11, 285/148.13, 148.7, 423; 220/62.22, 226, 220/288, 304, 601
See application file for complete search history.

(56) References Cited

U.S. PATENT DOCUMENTS

| 3,888,520 | A | * | 6/1975 | Brennan | ..................... 285/310 |
| 4,625,889 | A | * | 12/1986 | Baughman | .................. 220/288 |
| 6,035,884 | A | * | 3/2000 | King et al. | ................. 137/202 |
| 6,099,975 | A | * | 8/2000 | Peterson et al. | ............ 428/596 |
| 2002/0079694 | A1 | * | 6/2002 | Kurihara et al. | ........... 285/21.1 |

* cited by examiner

*Primary Examiner*—Aaron Dunwoody
*Assistant Examiner*—Fannie C. Kee
(74) *Attorney, Agent, or Firm*—Roylance, Abrams, Berdo & Goodman, L.L.P.

(57) ABSTRACT

A fitting for formation of a fluid-conducting connection on a container (1) of plastic, in particular a tank for receiving a fluid, specifically a hydraulic fluid, has a connection part in the form of a hollow element (5) with a jacket (21). The jacket extends along a longitudinal axis of the hollow element (5) between its ends (7, 23). The hollow element (5) is embedded in the plastic of the wall (3) of the container (1). An open end (7) of the hollow element (5) on the edge of an opening (9) in the container (1) and at least one partial area of the jacket (21) of the hollow element (5) are enclosed by the plastic of the wall (3) of the container (1).

15 Claims, 2 Drawing Sheets

FITTING FOR FORMATION OF A FLUID-CONDUCTING CONNECTION

FIELD OF THE INVENTION

The present invention relates to a fitting for formation of a fluid-conducting connection on an opening in the wall of a container of plastic, in particular a tank for receiving a fluid, specifically a hydraulic fluid.

BACKGROUND OF THE INVENTION

Plastic tanks are widely used in hydraulic systems to contain hydraulic fluids. Because of the possibility of relatively simple configuration, low weight, and corrosion resistance, plastic tanks are extensively used, especially in hydraulic systems of machines such as excavators, wheel loaders, and the like.

Such tanks are usually produced by well-known or conventional rotomolding or blow molding processes. Polyethylene or polyamide plastics, for example, are used for larger containers, such as tanks for hydraulic fluids.

The advantages of corrosion resistance, low weight, and ease of molding are offset in the case of plastic tanks, however, by the disadvantage that production of fluid-conducting connections at openings in the plastic wall of the container or tank occasions certain difficulties. Because of the physical properties of the plastic material, the danger exists that deformations may occur in the area of the opening as a result of sealing forces and temperature effects. Such deformations can lead to leaking between plastic tanks and add-on elements, even if costly sealing elements are employed.

SUMMARY OF THE INVENTION

An object of the present invention is to provide a fitting which permits an operationally reliable, long-term, leak-free connection to an opening in a plastic container.

This object is attained according to the present invention by a fitting with a connection part in the form of a hollow element embedded in the plastic of the wall of a container accordingly forming a reinforcing element. Because of the large area of embedding in the plastic material of the tank, which material not only encloses the hollow element at its open end at the opening in the container, but also extends over at least part of the area of the jacket of the hollow element, the reinforcing element forms an intrinsically strong base for mounting add-on elements, such as connections and/or sealing elements. The hollow element material, preferably of metal, permits both operationally reliable joining with connections or add-on elements which are integrated into an associated hydraulic system, and contributes to reinforcement of the area of the plastic container or tank situated in the area of the opening.

In advantageous exemplary embodiments of the present invention, the hollow element for formation of a fluid-conducting connection has, spaced a certain distance from the ends of the hollow element, a connecting branch. The connecting branch projects from the jacket and extends transversely to the longitudinal axis. Also, this connecting branch forms a fluid passage in the jacket of the hollow element, penetrating the wall of the container and extending to the exterior.

If the hollow element, which preferably is configured to be integral with the connecting branch, is made of a metal material, the hollow element embedded over a large area reliably protects the plastic material of the container wall against deformation. The loads applied to the hollow element, such as fastening forces, sealing forces and dynamic (vibration) and thermal effects, cannot of themselves cause deformation of the structural hollow element, nor can these loads directly affect the plastic material of the container since they are introduced over the entire area of embedding of the hollow element in the container.

In advantageous exemplary embodiments, the end of the connecting branch penetrating the wall of the container is configured to extend beyond the exterior of the wall of the container. The connecting branch is embedded in the plastic of the wall of the container in such a way that the projecting part of the connecting branch is enclosed at least partly in plastic. The embedding of hollow element and connecting branch over the entire area achieved in this manner guarantees particularly high structural strength.

In preferred exemplary embodiments, the hollow element is configured as a circular cylinder and has, a short distance from the end associated with the opening in the container, a flange. The flange is embedded in the plastic on the edge of the opening so that it is enclosed in its entirety externally by the portion of material extending along the jacket of the hollow element. Especially good anchoring of the hollow element against axial forces acting along the longitudinal axis of the hollow element is thereby achieved.

In exemplary embodiments in which the opening in the container may be sealed tightly by a sealing element in the form of a cap, for example, the hollow element may be embedded. Its end projects outward beyond the edge of the opening in the container. A sealing configuration for a sealing connection with the closing element is provided on the projecting end.

As an alternative, the hollow element may have, in its interior in the vicinity of its opening associated with the opening in the container, an annular groove. The groove forms the seat of an annular sealing element which acts together with an annular surface to effect sealing. This annular surface extends from a closing element which may be mounted on the opening into the interior of the hollow element.

In the case of a closing element in the form of a cap, the cap may also have an element on which is provided a sealing configuration projecting radially beyond the edge of the hollow element to effect sealing together with the wall enclosing the opening.

On its end facing away from the opening in the container, the hollow element may have a seat for mounting a tank-top filter. The filter can be accessible by the opening in the container by the assumed closing element, for example, for the purpose of replacing the hollow element.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure.

DETAILED DESCRIPTION OF THE INVENTION

Figure 1:
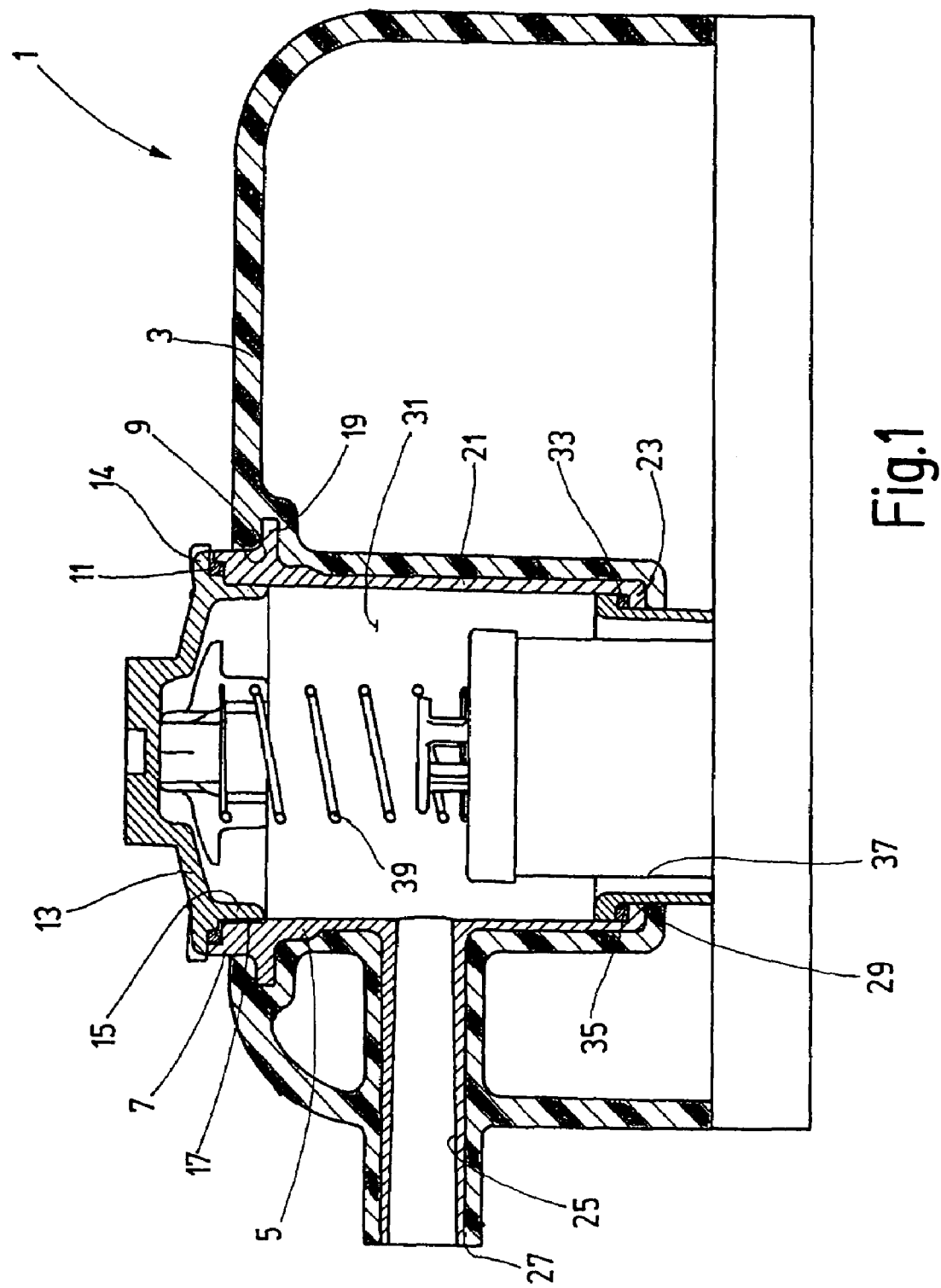
FIG. 1 is a side elevational view in section of an upper partial area of a container in the form of a plastic tank for receiving a hydraulic fluid having a fitting according to an exemplary embodiment of the present invention and forming a receptacle for a tank-top filter.

FIG. 1 shows the upper area of a container in the form of a plastic tank 1 made of a plastic material suitable for larger containers by the known rotomolding process (cf. Schaab/Stoeckhert, AKunststoff Maschinenführer@ [Plastic Machine Operator]), pages 561-564). In the rotomolding process, a hollow element 5 in the form of a circular cylinder is molded in the plastic wall 3 so that the upper end 7 of the hollow element 5 is adjacent to the interior of an opening 9 in the wall 3 of the tank 1. In the example shown in FIG. 1, the end 7 of the hollow element 5 projects slightly beyond the exterior of the wall 3. On the projecting end, a sealing ring 11 is provided. In conjunction with a closing element in the form of a screw cap 13, the sealing ring permits a tight closing on the upper end 7 of the hollow element 5, and accordingly seals of the opening 9 in the container wall 3.

The cap 13 has a threaded component in the form of an annular element 15 which may be screwed or threaded with an interior threading 17 onto the interior surface of the hollow element 5.

In the exemplary embodiment shown in FIG. 1, the hollow element 5 is integrated by squeeze molding and has externally near its end 7 a circumferential flange 19. Approximately in the central area of its jacket 21, between the upper end 7 and lower end 23, a connecting branch 25 is integral with and extends from jacket 21, at a right angle to the longitudinal or cylinder axis of the hollow element 5. The wall thickness of the branch 25 decreases slightly from the jacket 21 to the free end 27, something which favors molding of the workpiece in production of the hollow element 5 by squeeze molding. On its lower end 23, the jacket 21 of the hollow element 5 has a lower end edge 29 projecting radially slightly inward. Edge 29 slightly reduces the diameter of the respective opening of the interior 31 of the hollow element 5 in the form of a circular cylinder and forms an annular shoulder 33 forming a seat for a commercially available tank-top filter 37. The filter rests on the annular shoulder by a sealing ring 35. A pressure spring 39 mounted between the upper side of the filter 37 and the cap 13 holds the filter 37 against the seat by the force of the tension of the spring.

As is clearly to be seen in the drawing, the hollow element 5 is embedded in the plastic of the container wall 3 so that the hollow element 5 is enclosed in plastic at the upper end 7 and over the entire exterior surface of the flange 19. The plastic extends along the jacket 21 of the hollow element 5 to the lower end 23, where the plastic also extends beyond the lower end edge 29 of the jacket 21. In addition, not only is the connecting branch 25 enclosed entirely in plastic over the section between jacket 21 and the interior of the container wall 3, but the plastic of the wall 3 also encloses the connecting branch 25 on the exterior of the tank 1. As has already been mentioned, the hollow element 5 forms a connection part for add-on elements, such as a fluid connection on the end of the connecting branch 25. This connection part acts as a reinforcing element which, because of the large area of enclosure in the plastic material of the container wall 3 and causes the forces acting on the latter to introduce such lower specific surface pressure into the plastic of the tank 1 that deformation of the tank is prevented.

Figure 2:
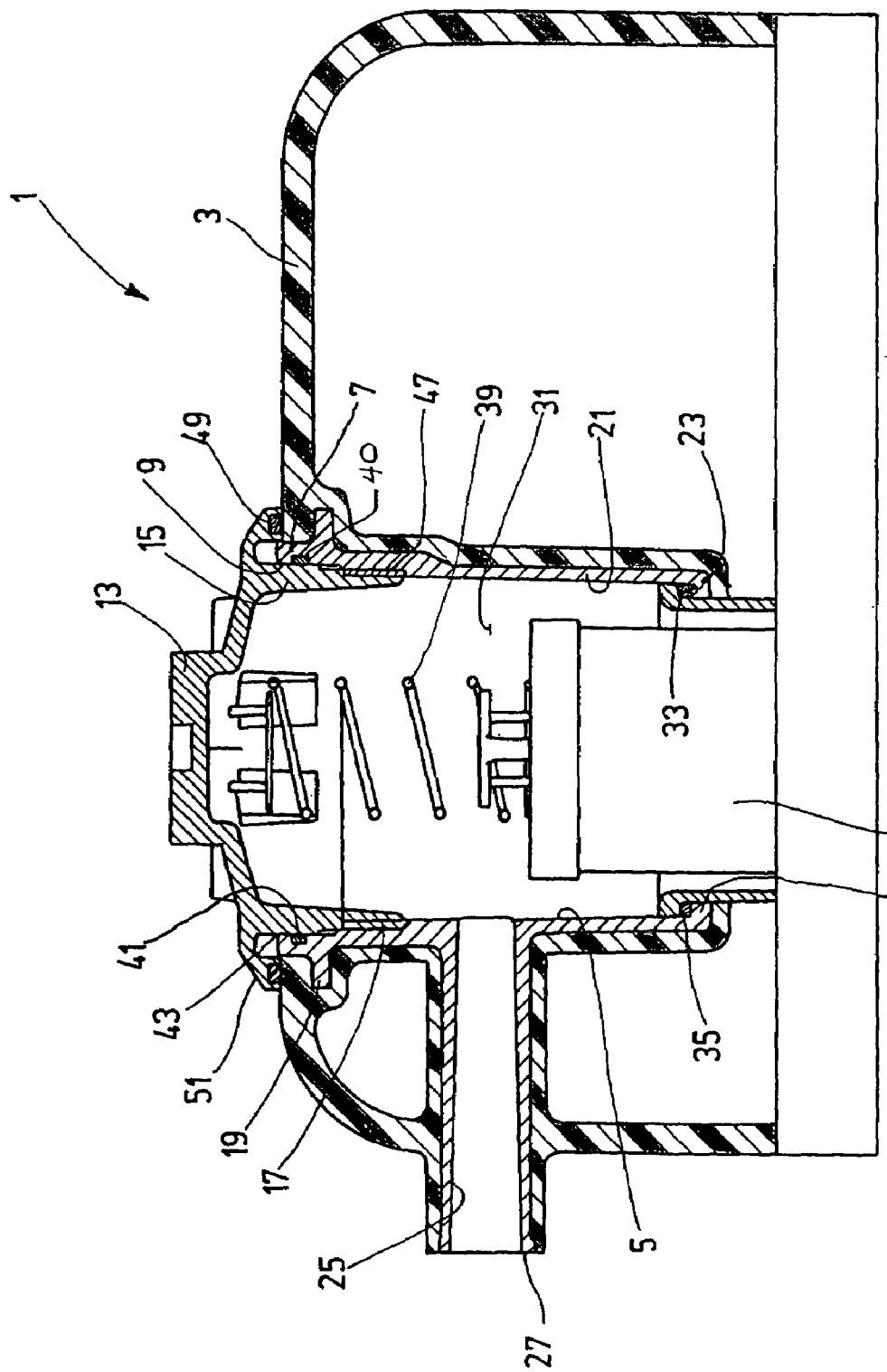
FIG. 2 is a side elevational view in section of an upper portion of a container in the form of a plastic tank for receiving a hydraulic fluid having a fitting of a second exemplary embodiment of the present invention.

The second exemplary embodiment illustrated in FIG. 2 differs from that shown in FIG. 1 only to the extent that the sealing configuration between cap 13 and the upper end 7 of the hollow element 5 is different in shape. In the example shown in FIG. 2, the upper end 7 of the hollow element 5 is more or less flush with the exterior of the plastic wall 3 of the tank 1. In place of the sealing configuration 11 shown in the example in FIG. 1 provided as an axial seal between hollow element 5 and cap 13, in the example illustrated in FIG. 2 an annular groove 40 is in the vicinity of the end 7 on the interior surface of the hollow element 5. In that groove, a radial seal 41 is seated. This seal 41 acts in conjunction with an annular surface 43 positioned on the annular element 15 of the cap 13. This annular element 15 extends into the interior 31 of the hollow element 5, and has, following its unthreaded annular surface 43, acting in conjunction with the seal 41, a section with exterior threading 47. Threading 47 may be screwed into the interior threading 17 of the hollow element 5.

In addition to the radial seal 41, a sealing connection is provided between cap 13 and container 1 by an axial seal 49 which is seated in an annular groove on the surface of a circumferential edge 51 facing the wall 3 of the cap 13. This circumferential edge 51 projects radially above the upper end 7 of the hollow element 5 a greater distance than does the circumferential edge 14 of the first exemplary embodiment. The axial seal 49 in the example shown in FIG. 2 accordingly acts directly in conjunction with the exterior of the wall 3 of the tank 1.

In the examples illustrated in the figures and described in the foregoing there is, on the end 7 of the hollow element 5 associated with the opening 9 in the container wall, a closing element in the form of a cap 13. The opening 9 in the wall 3 of the container 1 serves in these examples as an access opening for the tank-top filter 37. The connecting branch 25 connected to the interior 31 of the hollow element 5 is provided for formation of a fluid-conducting connection. Connecting or add-on elements of a kind different from that of the cap 13 could be provided on the connection part in the form of the hollow element 5. For example, a connecting head of a tank-top filter could be fastened on the associated end 7 of the hollow element 5 in place of the cap 13. In each instance, the advantages in question based on the presence of a connection part in the form of a hollow element 5 embedded over a large area into the plastic material of the wall 3 of the tank 1 are also obtained with such exemplary embodiments.

While various embodiments have been chosen to illustrate the invention, it will be understood by those skilled in the art that various changes and modifications can be made therein without departing from the scope of the invention as defined in the appended claims.

What is claimed is:

1. A fitting for forming a fluid-conducting connection, comprising:
   a plastic container having a wall and an opening in said wall;
   a circular cylindrical hollow element with a jacket extending along a longitudinal axis of said hollow element between first and second ends thereof, said hollow element being embedded in the plastic of said wall of said container, said first end being open and adjacent said opening, at least a partial area of said jacket being enclosed by the plastic of said wall;

a flange extending from said jacket, being closer to said first end than said second end and being embedded in the plastic of said wall adjacent an edge of said opening, said flange being fully enclosed on an exterior thereof by the plastic extending along said jacket;

an inner surface on said hollow element having an annular groove adjacent said first end receiving and seating an annular sealing element; and a closing element having an annular surface extending therefrom and into an interior of said hollow element and forming a seal with said annular sealing element, said closing element being mounted on said opening, said closing element being a cap having an annular element with an exterior thread engaging an interior threading on said inner surface of said hollow element, said cap having a radially extending circumferential edge overlapping an edge of said hollow element, said circumferential edge having a part projecting radially beyond said edge of said hollow element with a sealing member forming a seal with said wall enclosing said opening.

2. A fitting according to claim 1 wherein
said container is a tank receiving a hydraulic fluid.

3. A fitting according to claim 1 wherein
said hollow element has a connecting branch extending transversely to said longitudinal axis from said jacket at a distance from said first and second ends, said connecting branch forming a fluid passage from said jacket to an exterior of said container and penetrating said wall.

4. A fitting according to claim 3 wherein
said hollow element and said connecting branch are integral, and are formed of metal.

5. A fitting according to claim 3 wherein
one end of said connecting branch penetrates said wall, projects outward beyond said exterior of said container, and is embedded in the plastic of said wall such that a projecting part of said connecting branch is at least partially enclosed in the plastic.

6. A fitting according to claim 5 wherein
said projecting part of said connecting branch extends from said jacket to a free end thereof and has an outer area entirely enclosed by plastic forming an uninterrupted plastic structure extending from the plastic of the wall in which said jacket is enclosed, along said connecting branch to said wall, and beyond said exterior of said container along said connecting branch.

7. A fitting according to claim 1 wherein
said annular sealing element includes said annular surface.

8. A fitting according to claim 1 wherein
said second end of said hollow element has a seat receiving a tank-top filter.

9. A fitting for forming a fluid-conducting connection, comprising:

a plastic container having a wall and an opening in said wall;

a circular cylindrical hollow element with a jacket extending along a longitudinal axis of said hollow element between first and second ends thereof, said hollow element being embedded in the plastic of said wall of said container, said first end being open and adjacent said opening, at least a partial area of said jacket being enclosed by the plastic of said wall;

a flange extending from said jacket, being closer to said first end than said second end and being embedded in the plastic of said wall adjacent an edge of said opening, said flange being fully enclosed on an exterior thereof by the plastic extending along said jacket; and a closing element cap having an annular element with an exterior thread engaging an interior threading on an inner surface of said hollow element and having a radially extending circumferential edge overlapping an edge of said hollow element, said circumferential edge having a part projecting radially beyond said edge of said hollow element with a sealing member forming a seal with said wall enclosing said opening.

10. A fitting according to claim 9 wherein
said container is a tank receiving a hydraulic fluid.

11. A fitting according to claim 9 wherein
said hollow element has a connecting branch extending transversely to said longitudinal axis from said jacket at a distance from said first and second ends, said connecting branch forming a fluid passage from said jacket to an exterior of said container and penetrating said wall.

12. A fitting according to claim 11 wherein
said hollow element and said connecting branch are integral, and are formed of metal.

13. A fitting according to claim 11 wherein
one edge of said connecting branch penetrates said wall, projects outward beyond said exterior of said container, and is embedded in the plastic of said wall such that a projecting part of said connecting branch is at least partially enclosed in the plastic.

14. A fitting according to claim 13 wherein
said projecting part of said connecting branch extends from said jacket to a free end thereof and has an outer area entirely enclosed by plastic forming an uninterrupted plastic structure extending from the plastic of the wall in which said jacket is enclosed, along said connecting branch to said wall, and beyond said exterior of said container along said connecting branch.

15. A fitting according to claim 9 wherein
said second end of said hollow element has a seat receiving a tank-top filter.

* * * * *